P. B. BAKER.
Cotton-Planter.
No. 26,404.
Patented Dec. 13, 1859.
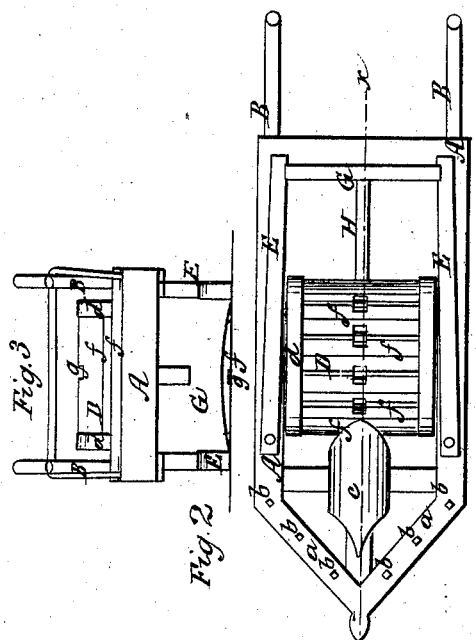
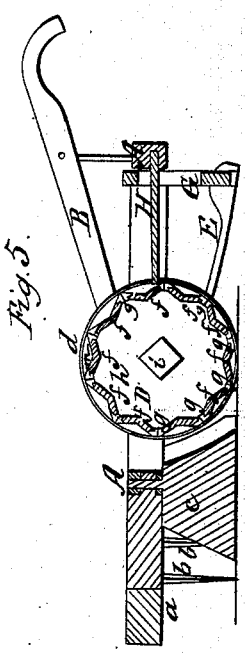
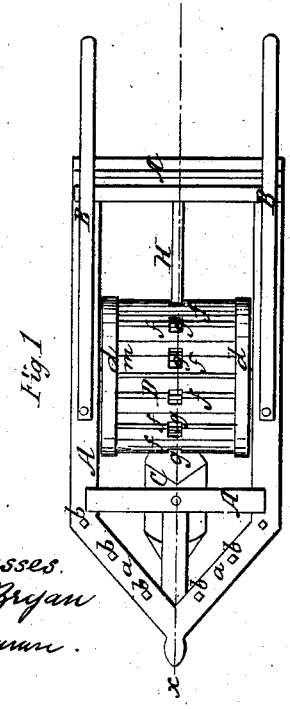
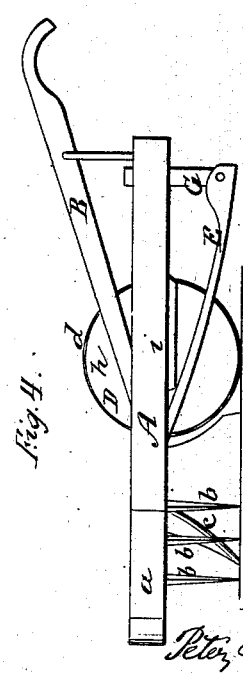

UNITED STATES PATENT OFFICE.

P. B. BAKER, OF WALL HILL, MISSISSIPPI.

IMPROVEMENT IN COTTON-SEED PLANTERS.

Specification forming part of Letters Patent No. 26,404, dated December 13, 1859.

*To all whom it may concern:*

Be it known that I, PETER B. BAKER, of Wall Hill, in the county of Marshall and State of Mississippi, have invented a new and Improved Cotton-Seed Planter; and I do hereby declare that the following is a full and exact description thereof, reference being had to the accompanying drawings, making part of this specification—

Figure 1 being a plan of the machine; Fig. 2, a plan of the under side thereof; Fig. 3, a rear elevation of the same; Fig. 4, a side elevation thereof; Fig. 5, a vertical section in the plane indicated by the line $x\ x$, Figs. 1 and 2.

Like letters designate corresponding parts in all the figures.

All the parts are mounted in an oblong frame, A, which is guided by handles B B. The frame terminates in front with a V-shaped harrow-frame, $a$, which is provided with a set of teeth, $b\ b$, for clearing the ridge or row of obstructions. Immediately behind the harrow or clearer is a drill-opener, C, centrally situated, made of iron or other suitable material, for preparing a furrow to receive the cotton-seed. Behind the drill-opener is situated a hollow drum, D, which receives and drops the cotton-seed. This drum is composed of a set of staves or segments, $ff$, secured around heads $h$, Fig. 5, by bands or hoops $d\ d$. In constructing the drum it is convenient to make the segments separate like staves; but it is obvious that the whole periphery might be made from one piece of wood or other material, or in any other convenient number of pieces. The form of the interior of the periphery, in whatever way constructed, is zigzag in cross-section, or in alternate ridges and hollows, substantially as shown in Fig. 5. At the bottom of each hollow an aperture, $g$, is made midway of the length of the drum, sufficiently large to allow the free escape outward of the cotton-seeds by their own weight as the drum revolves, and presents the apertures in succession downward. These apertures are generally formed by notching tangentially across the ridges of the periphery of the drum on the outside, as represented in the drawings. Thus the ridges of the drum, bearing upon the earth at each side of the furrow, while the apertures $g\ g$ are directly over the furrow, keep the said apertures entirely away from the earth, so that they are not clogged or stopped up thereby. But to secure against all chance of obstructing the apertures a clearer, H, is employed, which projects forward from the rear part of the frame A into the notches of said apertures, and thus continually removes anything which may by accident have lodged therein. This clearer also serves to set free additional cotton-seeds which lodge in the apertures without falling through by their own weight, so that another quantity of seed is dropped after the first regular dropping. As the first deposit of seed is partially covered by the pressure of the seed-drum itself on the earth at the sides of the furrow, this additional deposit of seed is not covered so deeply as the previous, and in this way both deep and shallow planting is accomplished at once as a safeguard against excessive rain or excessive drought succeeding.

In order to complete the covering of the seeds, a drag-board or scraper, G, finally follows, its under edge being hollowed in the middle, as shown in Fig. 3, to leave the surface of the ground in the proper shape. This scraper is secured to long wooden springs E E, extending forward and upward to the sides of the frame A, to which they are secured. The springs act also as shoes or runners, on which the hind part of the machine rests.

By pressing on the handles of the machine with various degrees of force these spring-runners also are more or less bent, and the depth to which the seed is planted is therefore varied at the pleasure of the attendant.

In order to get access to the interior of the drum D, one of the segments $f$ may be removable, as at $m$, for the purpose, or any other convenient arrangement may be adopted.

I disclaim the drum D and the clearer H separated as seen in J. A. Stewart's patent, dated July 1, 1856. Therefore

What I claim as my invention, and desire to secure by Letters Patent, is—

The arrangement of the teeth $b\ b$ in front of the drill-opener C, and the scraper G, secured upon the spring runners or shoes E E, in combination with the seed-drum D, substantially in the manner and for the purpose herein specified.

In witness that the above is a true specification of my improved cotton-planter I hereunto set my hand this 17th day of May, 1859.

PETER B. BAKER.

Witnesses:
T. W. BRYAN,
W. J. CANNON.